United States Patent
Horn et al.

(10) Patent No.: US 9,198,017 B2
(45) Date of Patent: Nov. 24, 2015

(54) INFRASTRUCTURE ASSISTED DISCOVERY IN A WIRELESS PEER-TO-PEER NETWORK

(75) Inventors: Gavin Bernard Horn, La Jolla, CA (US); Ashwin Sampath, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1243 days.

(21) Appl. No.: 12/123,349

(22) Filed: May 19, 2008

(65) Prior Publication Data

US 2009/0285119 A1    Nov. 19, 2009

(51) Int. Cl.
| | |
|---|---|
| H04L 12/28 | (2006.01) |
| H04W 4/00 | (2009.01) |
| H04W 8/00 | (2009.01) |
| H04W 84/02 | (2009.01) |
| H04W 84/18 | (2009.01) |
| H04W 52/02 | (2009.01) |

(52) U.S. Cl.
CPC .......... *H04W 8/005* (2013.01); *H04W 52/0216* (2013.01); *H04W 52/0219* (2013.01); *H04W 84/02* (2013.01); *H04W 84/18* (2013.01)

(58) Field of Classification Search
CPC ............... H04L 29/12216; H04L 41/0806; H04L 41/26; H04L 61/2007
See application file for complete search history.

(56) References Cited

U.S. PATENT DOCUMENTS

| | | | |
|---|---|---|---|
| 6,931,429 B2 | 8/2005 | Gouge et al. | |
| 7,072,975 B2 | 7/2006 | Kato | |
| 7,286,529 B1 * | 10/2007 | Thomas | 370/389 |
| 7,359,674 B2 | 4/2008 | Markki et al. | |
| 7,397,789 B2 * | 7/2008 | Chari et al. | 370/351 |
| 7,593,999 B2 | 9/2009 | Nathanson | |
| 7,613,156 B2 | 11/2009 | Rittle et al. | |
| 7,720,962 B2 | 5/2010 | Gupta et al. | |
| 8,135,443 B2 | 3/2012 | Aleksic et al. | |
| 2002/0184385 A1 | 12/2002 | Kato | |
| 2003/0051030 A1 | 3/2003 | Clarke et al. | |
| 2003/0208595 A1 | 11/2003 | Gouge et al. | |
| 2003/0220118 A1 | 11/2003 | Chhabra | |
| 2004/0042434 A1 | 3/2004 | Kennedy | |
| 2004/0072434 A1 | 4/2004 | Maruyama | |
| 2005/0063348 A1 * | 3/2005 | Donovan | 370/338 |
| 2005/0075148 A1 | 4/2005 | Park | |
| 2005/0208966 A1 | 9/2005 | David et al. | |

(Continued)

FOREIGN PATENT DOCUMENTS

| | | |
|---|---|---|
| CN | 1989741 A | 6/2007 |
| EP | 1653676 A1 | 5/2006 |

(Continued)

OTHER PUBLICATIONS

Buford J et al: "Sleeper: A Power-Conserving Service Discovery Protocol" Mobile and Ubiquitous Systems: Networking & Services, 2006 Third Annual International Conference on, IEEE, PI, Jul. 1, 2006, pp. 1-10, XP031068689 ISBN: 978-1-4244-0498-8 abstract p. 6, left-hand column, lines 10-31.

(Continued)

*Primary Examiner* — Melanie Jagannathan
(74) *Attorney, Agent, or Firm* — Stanton Braden

(57) ABSTRACT

Apparatuses and methods are disclosed for infrastructure assisted discovery in wireless peer-to-peer networks. Various discovery procedures may be implemented where a first node supports discovery of other nodes for a second node.

79 Claims, 9 Drawing Sheets

(56) References Cited

U.S. PATENT DOCUMENTS

| | | |
|---|---|---|
| 2006/0159032 A1* | 7/2006 | Ukrainetz et al. ............ 370/254 |
| 2006/0258338 A1 | 11/2006 | Markki et al. |
| 2007/0050761 A1 | 3/2007 | Hester et al. |
| 2007/0082249 A1 | 4/2007 | Shu et al. |
| 2007/0121521 A1 | 5/2007 | D'amico et al. |
| 2007/0124721 A1 | 5/2007 | Cowing et al. |
| 2007/0171910 A1 | 7/2007 | Kumar |
| 2007/0178876 A1 | 8/2007 | Yaqub et al. |
| 2007/0211678 A1 | 9/2007 | Li et al. |
| 2007/0244614 A1 | 10/2007 | Nathanson |
| 2007/0286136 A1 | 12/2007 | Rittle et al. |
| 2008/0031210 A1 | 2/2008 | Abhishek et al. |
| 2008/0043656 A1 | 2/2008 | Yoon et al. |
| 2008/0043665 A1 | 2/2008 | Jeon et al. |
| 2008/0107089 A1 | 5/2008 | Larsson et al. |
| 2008/0112334 A1 | 5/2008 | Laroia et al. |
| 2008/0270814 A1 | 10/2008 | Starr et al. |
| 2008/0273485 A1* | 11/2008 | Tsigler et al. ................ 370/328 |
| 2009/0287827 A1 | 11/2009 | Horn et al. |
| 2010/0278087 A1 | 11/2010 | Kawakami et al. |
| 2014/0092749 A1 | 4/2014 | Hui et al. |
| 2014/0093749 A1 | 4/2014 | Yang et al. |

FOREIGN PATENT DOCUMENTS

| | | | |
|---|---|---|---|
| EP | 1740001 | A1 | 1/2007 |
| EP | 1768425 | A1 | 3/2007 |
| GB | 2423891 | | 9/2006 |
| JP | 2004048503 | | 2/2004 |
| JP | 2005064722 | A | 3/2005 |
| JP | 2006217178 | A | 8/2006 |
| JP | 2007013989 | A | 1/2007 |
| JP | 2007129542 | A | 5/2007 |
| JP | 2007158418 | A | 6/2007 |
| JP | 2007202134 | A | 8/2007 |
| RU | 2005113877 | A | 10/2005 |
| RU | 2320008 | C2 | 3/2008 |
| TW | 200814811 | A | 3/2008 |
| WO | 2007044597 | | 4/2007 |
| WO | 2007082252 | | 7/2007 |
| WO | 2008023638 | A1 | 2/2008 |
| WO | 2008027975 | A2 | 3/2008 |

OTHER PUBLICATIONS

Hyoil Kim et al: "Efficient Discovery of Spectrum Opportunities with MAC-Layer Sensing in Cognitive Radio Networks" IEEE Transactions on Mobile Computing, IEEE Service Center, Los Alamitos, CA, US, vol. 6, No. 5, May 1, 2008, pp. 533-545, XP011202036 ISSN: 1536-1233 the whole document.

International Search Report and the Written Opinion—PCT/US2008/064277, International Search Authority—European Patent Office—Feb. 11, 2010.

Kaisen Lin et al: "Data Discovery and Dissemination with DIP" Information Processing in Sensor Networks, 2008. IPSN 08. International Conference on, IEEE, Piscataway, NJ, USA, Apr. 22, 2008, pp. 433-444, XP031246730 ISBN: 978-0-7695-3157-1 the whole document.

Se Gi Hong et al: "Accelerating Service Discovery in Ad-Hoc Zero Configuration Networking" Global Telecommunications Conference, 2007. GLOBECOM 07. IEEE, IEEE, Piscataway, NJ, USA, Nov. 1, 2007, pp. 961-965, XP031196113 ISBN: 978-1-4244-1042-2 abstract p. 963, left-hand column, line 22—p. 963, right-hand column, line 4.

Kitroser et al., Title: "IEEE 802.16e Sleep Mode" IEEE C802.16e-03/15r1, Date Submitted: Mar. 11, 2003.

Taiwan Search Report—TW097136236—TIPO—Feb. 21, 2012.

Taiwan Search Report—TW101117497—TIPO—Jul. 8, 2014.

\* cited by examiner

INFRASTRUCTURE ASSISTED DISCOVERY IN A WIRELESS PEER-TO-PEER NETWORK

BACKGROUND

1. Field

The present disclosure relates generally to wireless communications within unplanned user deployable networks, and more specifically, to infrastructure assisted discovery procedures in peer-to-peer wireless networks.

2. Background

Peer-to-peer ("P2P") networks are commonly used for connecting nodes via adhoc connections. These networks differ from the traditional client-server model where communications are usually with a central server. A peer-to-peer network may consist solely of peer nodes that communicate directly with one another, or may include a small number of servers to provide various services to the nodes in the network. These networks are useful for efficiently sharing files, media streaming, telephony, real-time data applications, and other communications.

In peer-to-peer networks supporting mobile nodes, various discovery and acquisition procedures are employed as the nodes move throughout the coverage region of the network. The process of discovering nodes in the network generally begins with the broadcast of a discovery signal. If a node detects a discovery signal from another node, it may initiate an acquisition procedure to set up a communication session using paging and access mechanisms defined by the network.

In order to conserve battery power, nodes typically do not continuously broadcast a discovery signal. Instead, the node remains in a low power state, or sleep mode, most of the time and wakes up periodically to broadcast a discovery signal. This procedure has been moderately successful in reducing power consumption for a node in a non-communicative state. However, there still may be times where the node is consuming excess power. By way of example, a node that periodically broadcasts a discovery signal when it is out of the coverage region of the network is unnecessarily consuming power. Accordingly, there is a need in the art to improve the way discovery is managed in peer-to-peer networks. These improvements should be applicable to other networks as well.

SUMMARY

In an aspect of the disclosure, an apparatus for wireless communications includes a processing system configured to a processing system configured to support discovery for a remote node.

In another aspect of the disclosure, an apparatus for wireless communications includes a processing system configured to use a remote node for discovery.

In yet another aspect of the disclosure, a method for wireless communications from an apparatus includes supporting discovery for a remote node.

In a further aspect of the disclosure, a method for wireless communications includes a processing system configured to use a remote node for discovery.

In yet a further aspect of the disclosure, an apparatus for wireless communications includes means for connecting to a remote node, and means for supporting discovery for the remote node.

In another aspect of the disclosure, an apparatus for wireless communications includes means for connecting to a remote node, and means for using the remote node for discovery.

In yet another aspect of the disclosure, an access point includes a wireless interface configured to support a backhaul connection for an access terminal, and a processing system configured to support the wireless interface, the processing system being further configured to support discovery for the access terminal.

In a further aspect of the disclosure, an access terminal includes a processing system configured to use an access point for discovery, and a user interface supported by the processing system.

In yet a further aspect of the disclosure, a computer-program product for communication includes a machine-readable medium comprising instructions executable by a processing system to support discovery for a remote node.

In another aspect of the disclosure, a computer-program product for communication includes a machine-readable medium comprising instructions executable by a processing system to use a remote node for discovery.

BRIEF DESCRIPTION OF THE DRAWINGS

Various aspects of a communications system are illustrated by way of example, and not by way of limitation, in the accompanying drawings, where like reference numerals may be used to denote like features throughout the specification and drawings, wherein.

Figure 1:
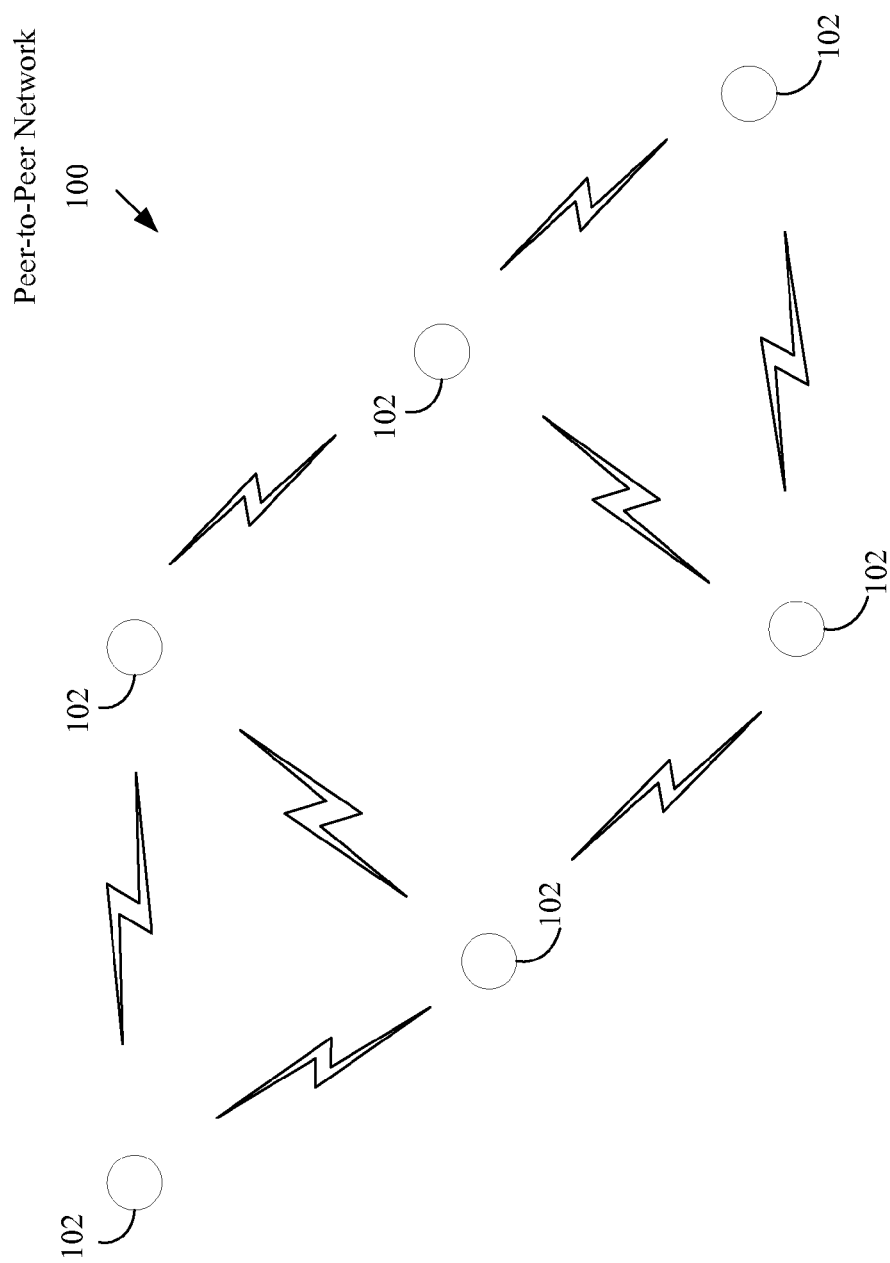
FIG. 1 is a conceptual diagram illustrating an example of a peer-to-peer wireless network.

In accordance with common practice, the various features illustrated in the drawings are intended as a description of various aspects of networks and network-related entities and is not intended to represent the only aspects within the scope of the claims. The drawings may include specific details for the purpose of providing a thorough understanding of a network or network-related entity, however, various aspects of the described networks and network-related entities may be implemented without these specific details. In some instances, well-known structures and components are shown in block diagram form in order to avoid obscuring various concepts described throughout this disclosure.

DETAILED DESCRIPTION

Various aspects of one or more methods and apparatuses are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. An aspect of any apparatus or method described throughout this disclosure may include a single element of any claim and/or any combination of elements in one or more claims.

In the following detailed description, various aspects of one or more methods and apparatuses will be described in the context of peer-to-peer wireless networks. However, as those skilled in the art will readily appreciate, the various aspects presented throughout this disclosure may be extended to a broad array of networks and communication protocols. Accordingly, any reference to a peer-to-peer wireless network is intended only to illustrate various aspects of a network, with the understanding that such aspects have a wide range of applications.

FIG. 1 is a conceptual diagram illustrating an example of a peer-to-peer wireless network. The network 100 is shown with a number of nodes 102, each which may be configured in various fashions. By way of example, a node 102 may be configured as a laptop computer, a mobile telephone, a personal digital assistant (PDA), a digital audio player, a game console, a digital camera, a digital camcorder, a multimedia device, or any other suitable device capable of supporting a peer-to-peer connection with other nodes 102 in the network 100. The node 102 may be referred to by those skilled in the art as an access terminal, handset, wireless communications device, user terminal, user equipment, mobile station, mobile unit, subscriber unit, subscriber station, mobile radio, radio telephone, wireless station, wireless device, or some other terminology. The various concepts described throughout this disclosure are intended to apply to all nodes regardless of their specific nomenclature.

In this example, the peer-to-peer network 100 is a self-configuring network of nodes 102 connected by wireless links, which together forms an arbitrary wireless topology. A node 102 may take advantage of the wireless topology to support a connection with a peer in the network 100, either directly or through one or more intermediates nodes. In the latter case, data is routed from one node to another until the data reaches its destination. Since the nodes are free to move throughout the coverage region, the wireless topology may change rapidly. Consequently, the peer-to-peer network is dynamically reconfigurable to maintain the connection as the nodes move throughout the coverage region.

Figure 2:
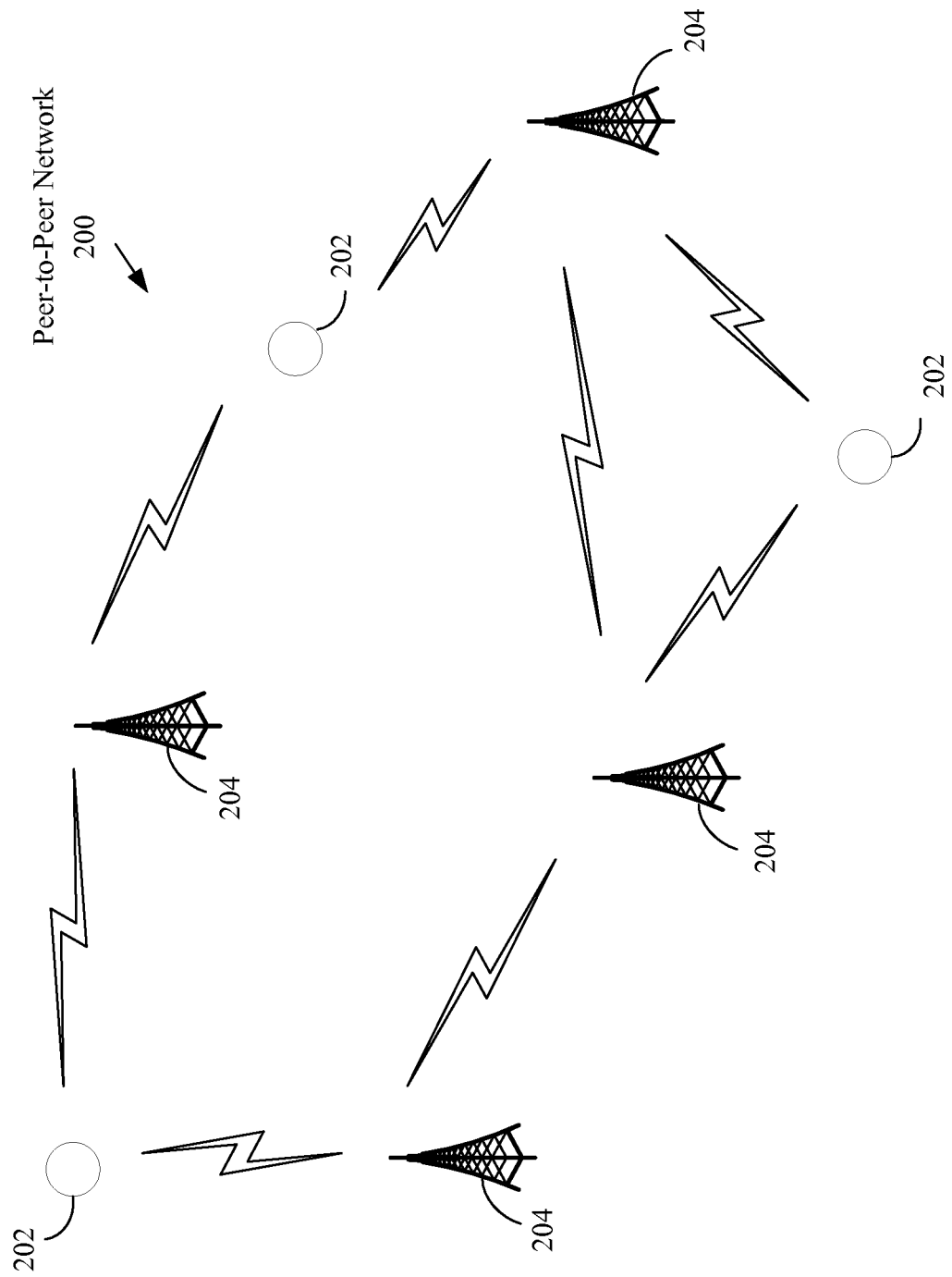
FIG. 2 is a conceptual diagram illustrating another example of a peer-to-peer wireless network.

FIG. 2 is a conceptual diagram illustrating another example of a peer-to-peer wireless network. In this example, the network 200 includes several infrastructure nodes 204, which are shown as fixed-site transceiver stations but may be implemented as mobile nodes in other configurations. An infrastructure node 204 may be referred to by those skilled in the art as an access point, relay point, NodeB, radio network controller (RNC), eNodeB, base station controller (BSC), base transceiver station (BTS), base station (BS), transceiver function (TF), radio router, radio transceiver, basic service set (BSS), extended service set (ESS), radio base station (RBS), or some other suitable terminology.

A node 202 may connect to an infrastructure node 204, or any other node in the network 200, either directly or through one or more intermediate nodes. Like the examples described earlier, the wireless topology is dynamically reconfigurable to maintain the connection as the nodes 202 move throughout the coverage region and the loading on the infrastructure nodes 204 changes. In one configuration of the network 200, the infrastructure nodes 204 may be distributed throughout a wireless wide area network (WWAN), such as might be the case in a network employing Wi-Max, Evolution-Data Optimized (EV-DO), Ultra Mobile Broadband (UMB), or some other suitable wireless standard. In another configuration of the network 200, the infrastructure nodes 204 may be distributed throughout a wireless local area network (WLAN) in a home, office building, airport, hotel, coffee shop, or other suitable private or public locale. In this example, an infrastructure node 204 may be used as an access point to a WLAN, such as and by way of example, a Wi-Fi network.

Figure 3:
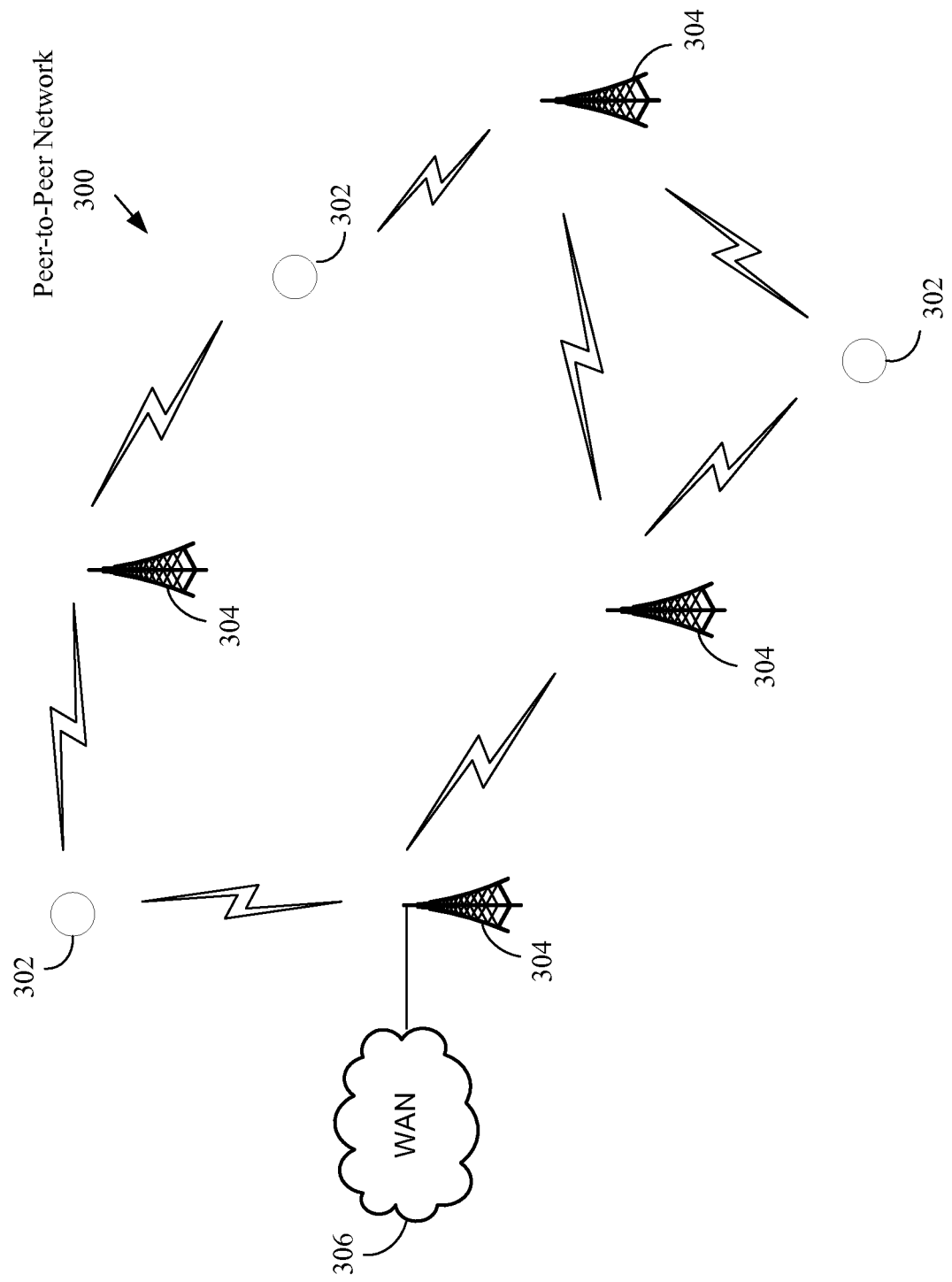
FIG. 3 is a conceptual diagram illustrating yet another example of a peer-to-peer wireless network.

The geographic reach of the peer-to-peer network 300 may be extended through a wide area network (WAN) such as the Internet or the like. An example of this peer-to-peer wireless network is shown in FIG. 3. In this configuration, any combination of nodes 302 and infrastructure nodes 304 may provide a wireless backhaul to the WAN 306 for other nodes 302. A single infrastructure node 304 may provide an access point to the WAN 306 through a wired connection as shown in FIG. 3, or alternatively, any number of infrastructure nodes 304 may have a wired or wireless connection to the WAN 306. The wireless topology is dynamically reconfigurable to maintain a connection between two nodes in the WAN 306 as those nodes, as well as others, move throughout the coverage region and the loading on the infrastructure nodes 304 varies.

When a node in one of the various network configurations described thus far, or some other suitable network configuration, initially comes on line, it attempts to discover other peers through a discovery procedure. The discovery procedure utilized by a node will depend on the type of peer connection that it wishes to establish. By way of example, the node may wish to have an anonymous connection with a peer. In this example, the node does not broadcast a discovery signal, thereby making its presence in the neighborhood anonymous. Instead, it attempts to join the network by decoding a reference signal, such as a beacon, from an infrastructure node (see FIGS. 2 and 3), or some other node or network-related entity. Once the node decodes the reference signal, it may register with the network by informing a network-related entity, such as a mobility agent, of its whereabouts so that it can be paged when another node in the network is attempting to establish a connection with it.

The discovery procedure utilized by the node may also support a peer connection with a fixed set of nodes. This discovery procedure may be well suited for a personal area network (PAN) comprising a collection of nodes owned by an individual. These nodes may include, by way of example, a laptop computer, a cellular phone, a headset, a microphone, a medical device, a biometric sensor, a heart rate monitor, a pedometer, an EKG device, a user I/O device, a watch, a remote control, a switch, a point-of-sale device, a hearing aid, a set-top box, etc. In this example, the identity of each node is known, a priori, by the other nodes via a list stored in the memory of each, or other means. In the case of a list, an in-band mechanism may be used to form the list.

When attempting to discover peers from this fixed set, a node listens for a discovery signal from its peers. A discovery signal received by the node from a peer may include a message that contains one or more attributes of the peer (e.g., a peer identifier). The node may then compare the message to a list of peers stored in memory to determine whether the peer belongs to the fixed set of nodes. If the node determines that the peer is contained in the list, the node may attempt to connect to the peer.

The node may also utilize a discovery procedure to support a peer connection with a specific type of peer where the identity of the peer is not known, a priori. This procedure may be well suited for a node that wishes to connect to a peer in a specific group, which might be the case when a node seeks local services like gaming, dating, shopping, etc. In this case, a message containing one or more attributes of peers (e.g., a group association identifier) may be included in the discovery signal broadcast by the peer. Alternatively, a network-related entity such as a server may provide assistance during the discovery procedure. In this configuration, the node may provide a message to a server which includes its location and the various attributes relating to the group association. The peer may determine its location using Global Positioning Systems (GPS), through other nodes that it is connected to, or by some other means. The server, in response to this message, may send information to the node which identifies nearby peers supporting the group association identified by the node. Preferably, the discovery procedure is configured to support a node which is a member of many groups simultaneously.

A discovery procedure may also be utilized that allows a node to connect with any other peer (i.e., no restricted association requirement). With this procedure, the node listens for discovery signals. If the node detects a discovery signal from a peer, it may attempt to establish a connection with it.

In at least one configuration of a peer-to-peer network, or other suitable network arrangement, a node may use another node to assist it with discovery. An example will now be presented with reference to FIG. 4, which illustrates a call flow between two nodes. In this example, an infrastructure node is assisting another node with discovery. However, as those skilled in the art will readily appreciate, the various concepts described in this example may be extended to any node assisting any other node in the peer-to-peer wireless network with discovery.

Figure 4:
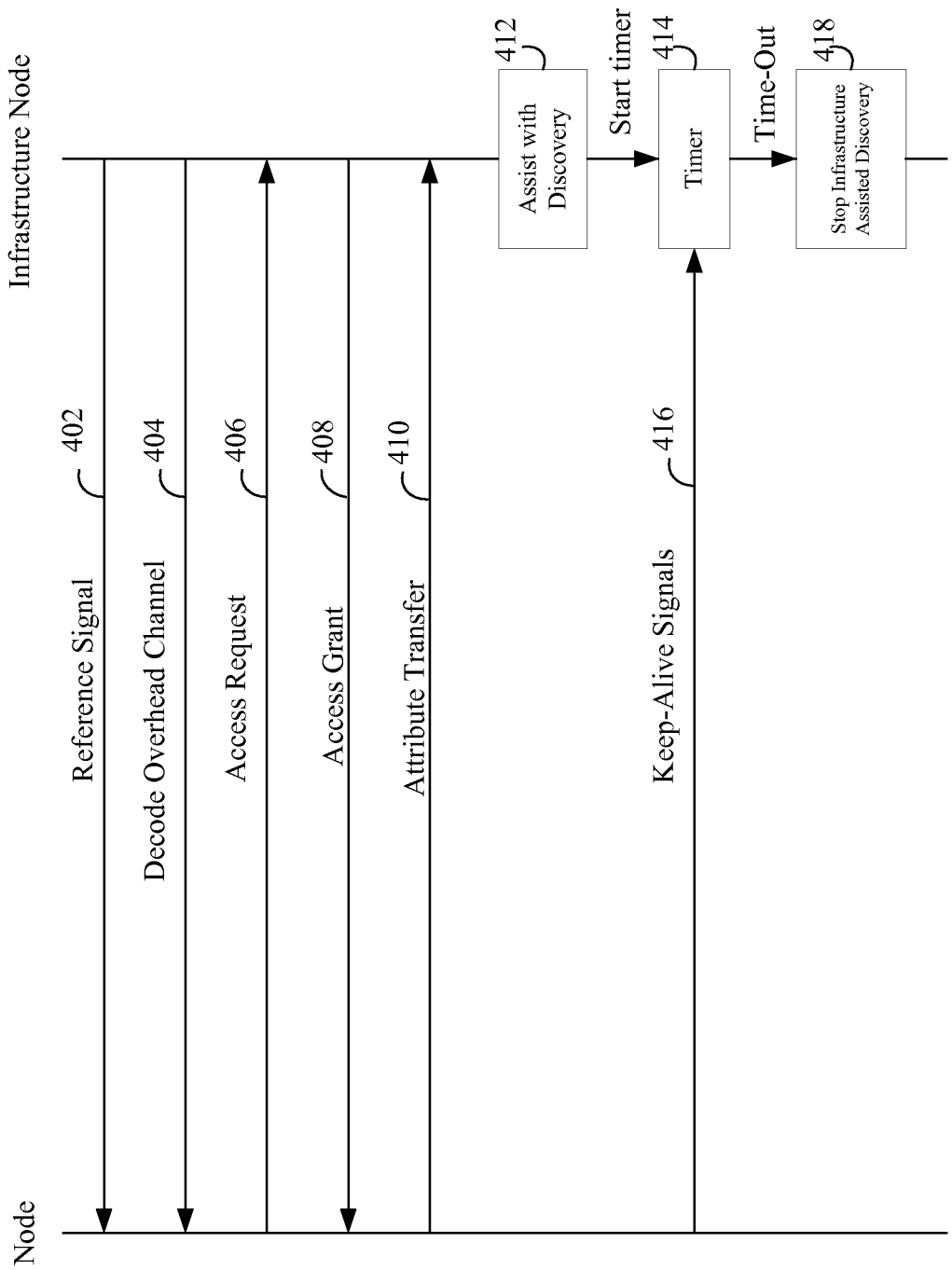
FIG. 4 is a conceptual diagram illustrating an example of a call flow for a node assisting another node with discovery in a peer-to-peer wireless network.

The following example may be useful when a node desires to conserve battery power during the discovery procedure by using an infrastructure node to broadcast its discovery signal and/or detect discovery signals from peers. Referring to FIG. 4, the node first attempts to discover an infrastructure node by decoding a reference signal broadcast from the infrastructure node as shown by arrow 402. Once the peer node discovers the infrastructure node, it may then decode an overhead channel to learn the capabilities of the infrastructure node as shown by arrow 404. The overhead channel may provide various information including whether the infrastructure node supports discovery on behalf of another node. Assuming the infrastructure node supports discovery, the node may connect to the infrastructure node by requesting access to the infrastructure node for that purpose as shown by arrow 406. The infrastructure node may respond with an access grant as shown by arrow 408. In response to the access grant, the node may communicate various attributes over a reverse link traffic channel (i.e., a traffic channel that supports a transmission from the peer node to the infrastructure node) as shown by arrow 410. These attributes may include, by way of example, a globally unique node identifier or some other identifier, a peer identifier (e.g., buddy list), group memberships, and/or any other information that is relevant to discovery.

Once this information is received, the infrastructure node may assist the node with discovery as shown by block 412. The manner in which this assistance takes place may vary. By way of example, the infrastructure node may broadcast the discovery signal for the node and the node may, on its own, listen for discovery signals from other nodes. In this example, the discovery may include information indicating that the infrastructure node is assisting the node with discovery (e.g., by setting a bit in the discovery signal broadcast by the infrastructure node). Alternatively, the node may broadcast its own discovery signal and allow the infrastructure node to listen for discovery signals from peers. Maximum assistance may be provided to the node when the infrastructure node both broadcasts the discovery signal for the node and listens for discovery signals from peers.

In at least one configuration of a peer-to-peer network, the infrastructure node may assume only a portion of the discovery for the node. By way of example, the node may broadcast the discovery signal some of the time and the infrastructure node may broadcast the discovery signal at other times. Similarly, the node may listen for discovery signal from peers some of the time and the infrastructure node may listen for discovery signals from peers at other times. Various configurations may be deployed where any combination of infrastructure assisted discovery procedures discussed thus far, and readily apparent to those skilled in the art from this disclosure, may be implemented. By way of example, the infrastructure node may broadcast the discovery signal while the responsibility for listening for discovery signals is split between the node and infrastructure node. This may be a static condition that is application specific, or alternatively, may be dynamically reconfigurable depending on channel conditions and other factors. As an example of the latter, the infrastructure node, while broadcasting discovery signals on behalf of the node, may later take on responsibility for listening to discovery signals from peers due to a change in channel conditions, a change in loading on the infrastructure node, or for some other reason.

Once an infrastructure node begins assisting another node with discovery, various mechanisms may be employed by the infrastructure node to monitor the whereabouts of the node. These mechanisms allow the infrastructure node to terminate discovery on behalf of the node when the node, by way of example, moves out of the coverage region of the infrastructure node. In at least one configuration of a peer-to-peer network, the infrastructure node maintains a timer as shown by block 414. The timer is restarted every time a keep-alive signal is received by the infrastructure node as shown by arrow 416. In this configuration, the node transmits a series of keep-alive signals to notify the infrastructure node that it still requires infrastructure assisted discovery. The keep-alive signals may be in the form of a broadcast of one or more discovery signals by the node, a transmission directed to the infrastructure node (e.g., accessing the infrastructure node, sending signals on a control channel, etc.), or some other type of signaling or communications. To conserve battery life, the node may go to sleep during all or a portion of the time between keep-alive signals. The infrastructure node stops assisting the node with discovery if the timer expires before a keep-alive signal is received as shown by block 418.

In the case where the infrastructure node is listening for discovery signals from peers on behalf of a node in the peer-to-peer network, it may notify the node upon discovering a peer. Similarly, the infrastructure node may notify the node if a peer of interest attempts to connect to the infrastructure node. The notification may take the form of a page or some other signaling. In response to the notification, an icon may appear on the display of the node indicating the presence of the peer, or a map may be presented to the display showing the peer. The node may then establish a connection with the peer, either directly, through the infrastructure node, or through one or more intermediate nodes (i.e., a multi-hop connection)

As those skilled in the art will readily appreciate, a node may be configured to support one or more of the discovery procedures discussed above. The node may also be configured to support additional discovery procedures, either instead of or in addition to, the ones described above, as well as other procedures such as paging, transmitting broadcast messages, etc.

Figure 5:
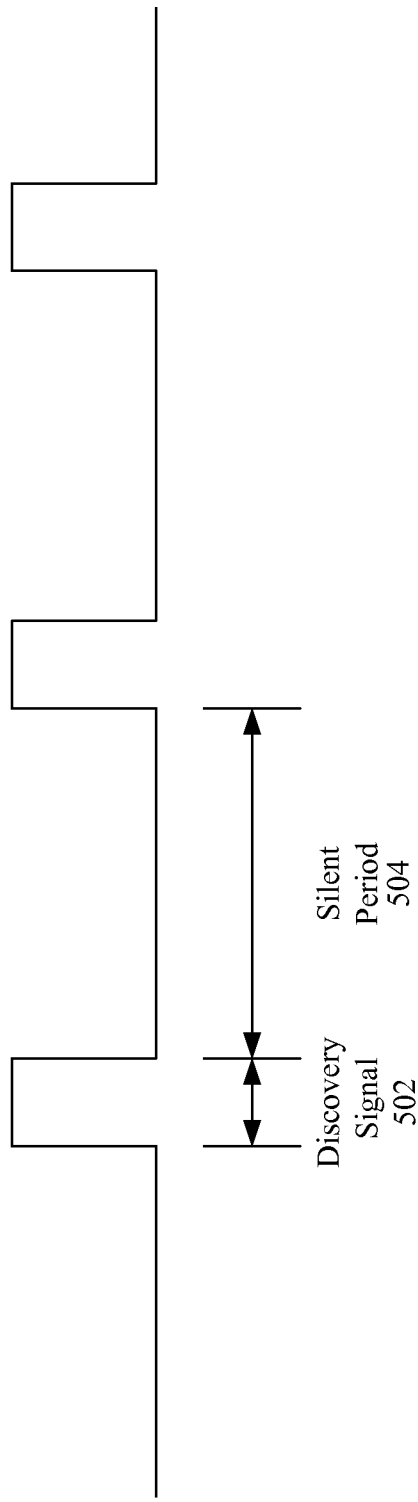
FIG. 5 is a timing diagram illustrating an example of a discovery procedure that may be implemented by a node.

FIG. 5 is a timing diagram illustrating an example of a discovery procedure that may be implemented by a node. In this example, the node supports a series of discovery signals 502 spaced apart in time by silent periods 504. The discovery signal may be a packet broadcast over a common or dedicated channel. The packet may contain a preamble comprising a pseudo-random number (PN), or multiple repetitions thereof, that is known, a priori, by all nodes in the network. During the silent periods 504, or any portion thereof, the node may also listen for discovery signals from peers. If the node detects a discovery signal from a peer, a connection may be established. In the case where the peer associates with only a fixed set of nodes, information in the discovery signal, or information provided by a server, may be used by the node to determine whether to establish a communications session. The discovery signals broadcast by the nodes may be synchronous or asynchronous, may use frequency or time reuse, and may be sent using code division multiple access (CDMA), orthogonal frequency division multiple access (OFDMA), or other suitable technologies used to support an air interface in a wireless telecommunications system.

To conserve battery power, the duration of the silent periods 504 may be varied depending on the current operating mode and/or environment. By way of example, the duration of the silent periods 504 may be increased when the battery in the peer node is fully charged and decreased when the battery is low. As another example, the duration of the silent periods 504 may be increased when the transmission power is high and decreased when the transmission power is low.

In some configurations of a node, the duration of the silent periods 504 may be changed based on the peers within radio range. By way of example, the silent periods 504 may be relatively long when the node is outside the radio range of any peers that it is authorized to communicate with. In this example, the silent periods 504 may be decreased as the node moves into radio range with one or more peer nodes to facilitate an active search. This generally requires that the node know where its peers are located relative to it, and therefore, is primarily applicable to infrastructure assisted discovery which will now be described in connection with FIG. 5.

Figure 6:
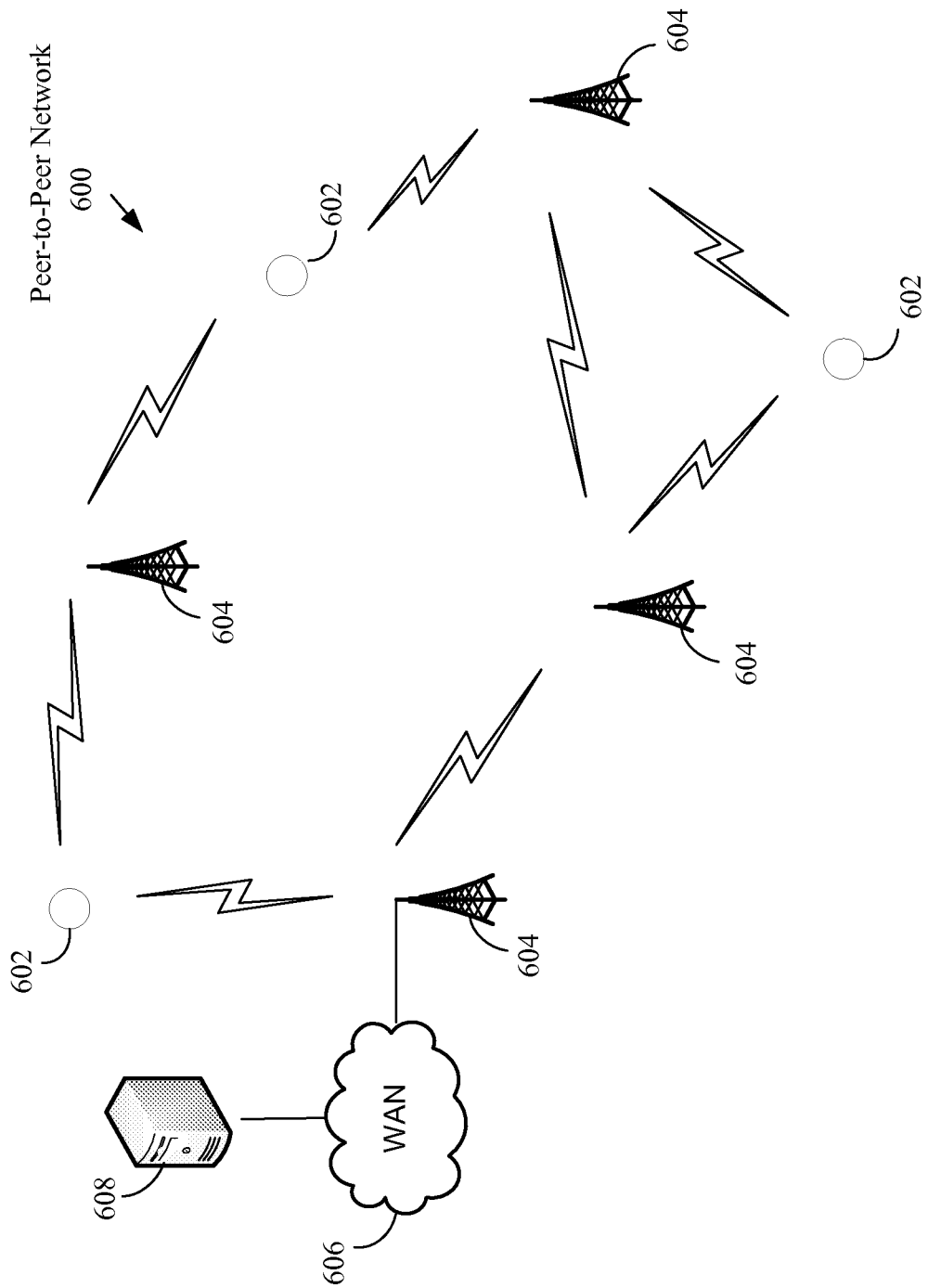
FIG. 6 is a conceptual diagram illustrating an example of a peer-to-peer wireless network supporting infrastructure assisted discovery.

FIG. 6 is a conceptual diagram illustrating an example of a peer-to-peer wireless network 600 supporting infrastructure assisted discovery. In this example, a node 602 registers with a discovery server 608. The discovery server 608 may be dependant on the type of services required by the node 602. By way of example, a node 602 seeking a connection to a peer in a specific group to access local services such as gaming, dating, shopping, etc., may access a specific server configured to support these services. Alternatively, a single server may be used. In the latter configuration, the peer 602 may send a profile which includes the types of services it requires when registering with the server 608.

The registration procedure may be implemented in various ways. By way of example, the node 602 may send a registration message to the server 608, which includes its location. Using the node's location contained in the registration message, the server 608 may respond by sending a list of peers in the vicinity of the node 602. The node 602 may query the server 608 to update its list as either it or its peers move throughout the network 600. In at least one configuration of a wireless peer-to-peer network, the list may also be updated when one or more peers move into or out of the vicinity of the node.

Returning to FIG. 5, the node may have relatively long silent periods when it is not in radio range with any peers that it is authorized to communicate with. In this mode, the node should broadcast a discovery signal only when it has a peer in its vicinity that it has not yet discovered, or the infrastructure assisted discovery is unreliable or unavailable. As the node moves into radio range with one or more peers, it may begin to actively search by decreasing the silent periods. Once the node discovers a peer node to connect with, it may then increase the duration of the silent periods. Alternatively, the node may be configured to increase the duration of the silent periods only after it discovers all peers in its network. In some configurations, the node may cease broadcasting a discovery signal all together, but it may be desirable to maintain discovery signal broadcasts separated by long silent periods to notify the peers that it has not moved out of radio range.

The change in the duration of the silent periods from discovery signal to discovery signal may be fixed or variable. In the latter case, the silent periods may become progressively shorter once the peer node moves into radio range with the peer nodes. The silent periods may be progressively shortened on a random basis, or alternatively, in accordance with a linear, polynomial, or exponential function, or some other function.

Figure 7:
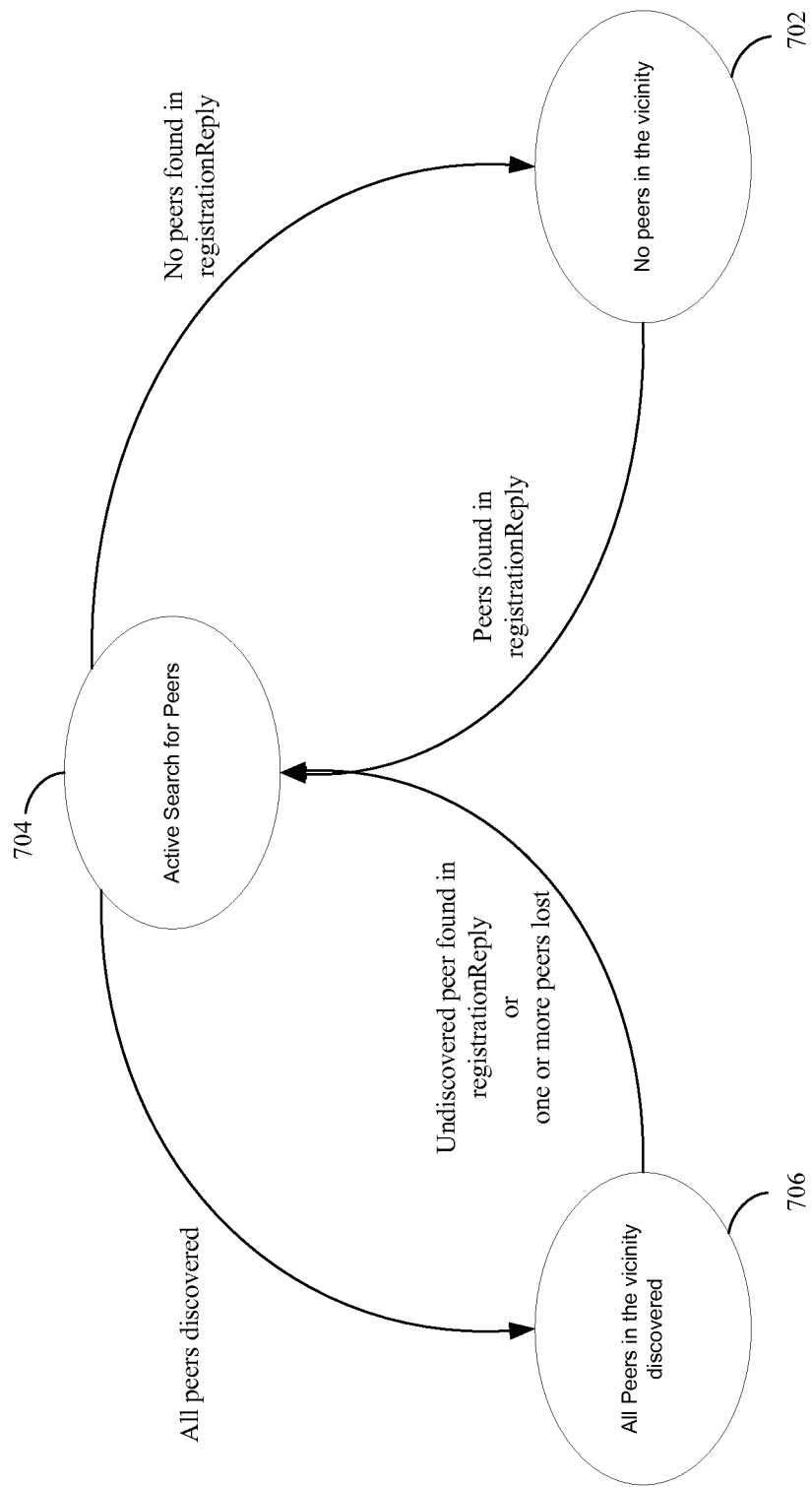
FIG. 7 is a state diagram illustrating an example of a discovery procedure implemented by a node a peer-to-peer wireless network.

FIG. 7 is a state diagram illustrating an example of a discovery procedure implemented by a node in a peer-to-peer wireless network. Each state defines a different periodicity for broadcasting discovery signals.

In this example, the node is in a first state 702 when no peers are in the vicinity. In this state, the discovery signal is sent out infrequently. The node may periodically send its location to a server via a registration message. A registration reply, or other message, may be sent back to the node identifying any peers in the vicinity. If there are no peers in the vicinity, then the node remains in the first state 702. If, on the other hand, the server indentifies one or more peers in the vicinity, the node enters a second state 704 where the frequency of the discovery signal is increased to actively search for the peers.

While the node is in the second state 704, it continues to periodically register with the server. If a registration reply is received from the server which indicates that there are no longer any peers in the vicinity, the node returns to the first state 702. Conversely, if the node is able to discover all of the peers identified in the registration reply from the server, it enters into a third state 706 where the frequency of the discovery signal is reduced. Should one or more peers be lost, or an undiscovered peer identified in a subsequent registration reply, then the node returns to the second state 704 to actively search by increasing the frequency of the discovery signal. Alternatively, instead of registering with the server periodically, the server may push the information to the node in the event that a peer enters or leaves the vicinity.

Figure 8:
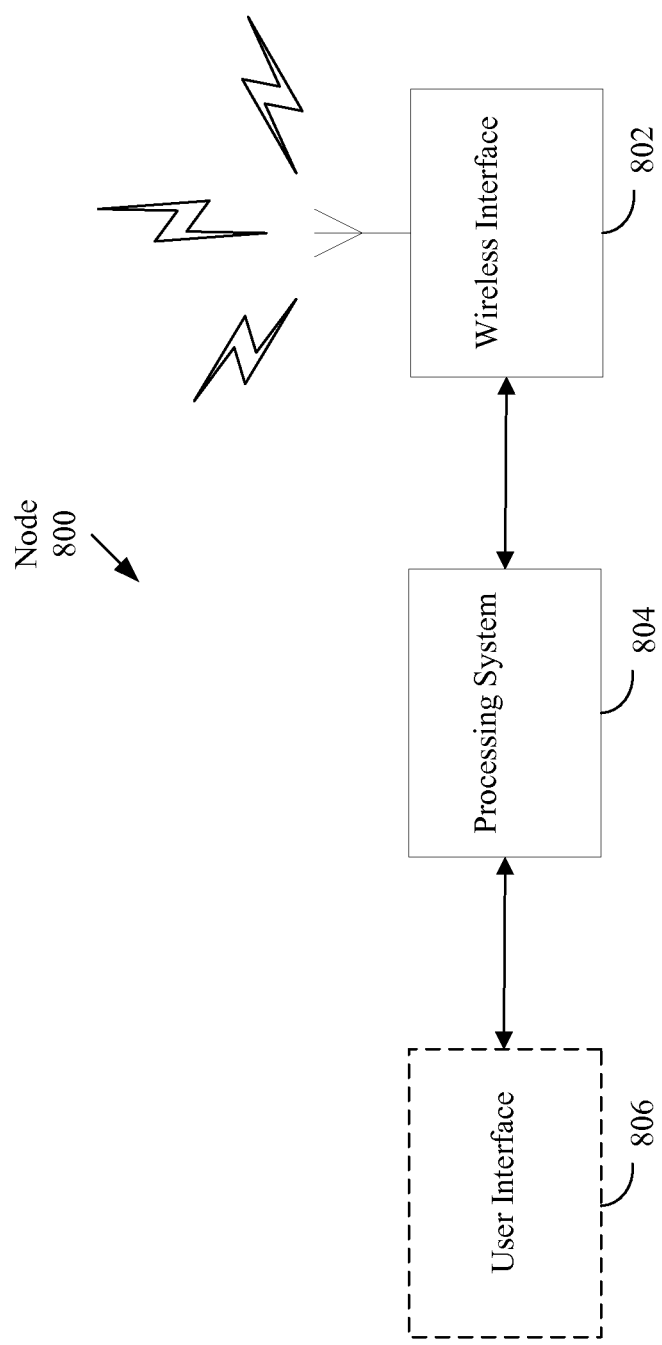
FIG. 8 is a block diagram illustrating an example of the functionality of a node.

FIG. 8 is a block diagram illustrating an example of the functionality of a node. The following description of a node 800 is informative in nature and broadly defines the functionality of each block. Only the functionality pertinent to various concepts disclosed herein will be described. Those skilled in the art will recognize that these functional blocks can provide other functionality that is not described herein. In this example, the node 800 includes at least two functional blocks: a wireless interface 802 and a processing system 804.

The wireless interface 802 may be configured as a transceiver that provides both a transmitting and receiving function. The transmitting function includes modulating a carrier with data. The receiving function includes demodulating a carrier to recover data. The wireless interface 802 may also provide various other functions, such as RF front-end processing, analog/digital conversion, timing and frequency estimation, channel estimation, turbo coding etc. In summary, the wireless interface 802 may be configured to provide the complete physical layer implementation of the node 800.

The processing system 804, either alone or in combination with other entities in the node 800, may be configured to implement all functionality above the physical layer. Alternatively, the processing system 804 may also implement all or part of the physical layer. In the most general terms, the processing system 804 is configured to use the transmitting and receiving functions of the wireless interface 802 to support communications. In one aspect of a node 800, the processing system 804 may be configured to support discovery for a remote node. In another aspect of a node 800, the processing system 804 may be configured to use a remote node for its own discovery.

The node 800 may function as an access terminal, access point, relay point, or any combination thereof. A node 800 that functions as an access terminal may include a user interface 806. The user interface 806 may include a display, keypad, speaker, microphone, and/or any other suitable interface that enables a user to operate the access terminal. The user interface 806 is used to control the data that is transmitted and received by the processing system 804 over a wireless uplink connection maintained by the wireless interface 802.

A node 800 that functions as an access point includes a wireless interface 802 that is capable of maintaining any suitable number of wireless downlink connections with access terminals and/or relay points, as well as maintain one or more uplink connections to support the backhaul. The uplink connection may be wired or wireless. By way of example, the access point may support a wireless uplink connection to a relay point and a wired uplink connection to another network (e.g., the Internet).

The processing system 804 may be implemented using software, hardware, or a combination of both. By way of example, a processing system may be implemented with one or more integrated circuits (IC). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the general purpose processor may be any conventional processor, controller, microcontroller, or state machine. A processing system may also be implemented as a combination of computing devices, e.g., a combination of a DSP and a microprocessor, a plurality of microprocessors, one or more microprocessors in conjunction with a DSP core, or any other such configuration.

The code or instructions may be embodied in one or more machine-readable media to support software applications. Software shall be construed broadly to mean instructions, programs, code, or any other electronic media content whether referred to as software, firmware, middleware, microcode, hardware description language, or otherwise. Machine-readable media may include storage integrated with a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system. Moreover, in some aspects any suitable computer-program product may comprise a computer-readable medium or machine-readable medium comprising codes relating to one or more of the aspects of the disclosure. In some aspects a computer program product may comprise packaging materials.

Figure 9A:
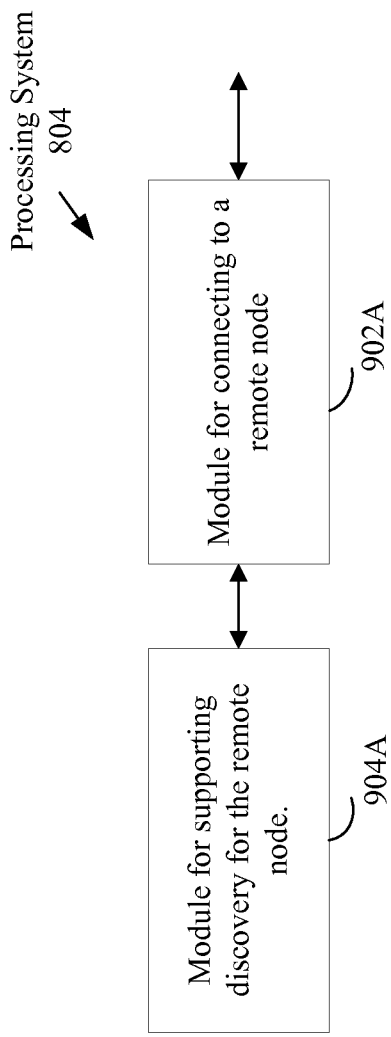
FIG. 9A is a block diagram illustrating an example of the functionality of a processing system.

FIG. 9A is a block diagram illustrating an example of the functionality of a processing system 804. In this example, the processing system 804 includes a module 902A for connecting to a remote node and a module 904A for supporting discovery for the remote node.

Figure 9B:
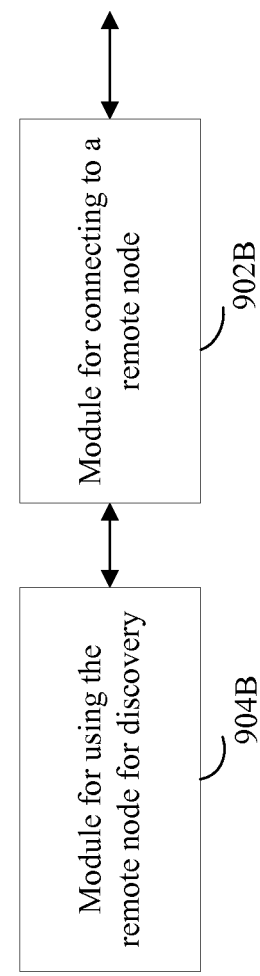
FIG. 9B is a block diagram illustrating another example of the functionality of a processing system.

FIG. 9B is a block diagram illustrating another example of the functionality of a processing system 804. In this example, the processing system 804 includes a module 902B for connecting to a remote node and a module 904B for using the remote node for discovery.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for wireless communications, comprising:
   a processing system configured to receive from a remote node a wireless request to support wireless discovery, and to respond to the request by sending to the remote node a wireless indication that the request is granted, and by assisting the remote node in wirelessly identifying another remote node that is available to communicate with the remote node via an ad hoc wireless connection.

2. The apparatus of claim 1 wherein the processing system is further configured to support the discovery by broadcasting a discovery signal for the remote node.

3. The apparatus of claim 2 wherein the discovery signal comprises information indicating that the discovery signal is being broadcast for the remote node.

4. The apparatus of claim 1 wherein the processing system is further configured to support the discovery by listening for a discovery signal.

5. The apparatus of claim 4 wherein the processing system is further configured to notify the remote node in response to receiving a discovery signal from said another remote node so that the remote node can connect to said another remote node.

6. The apparatus of claim 1 wherein the processing system is further configured to communicate to the remote node that the processing system is capable of supporting discovery for the remote node.

7. The apparatus of claim 1 wherein the processing system is further configured to receive a communication from the remote node comprising one or more attributes related to the discovery for the remote node.

8. The apparatus of claim 7 wherein the processing system is further configured to support the discovery by listening for a discovery signal having at least one of the one or more attributes.

9. The apparatus of claim 1 wherein the processing system is further configured to continue to support the discovery for the remote node in response to a keep-alive signal from the remote node.

10. The apparatus of claim 9 wherein the processing system comprises a timer, and wherein the processing system is further configured to stop supporting the discovery for the remote node if the timer expires before the keep-alive signal is received from the remote node.

11. The apparatus of claim 9 wherein the keep-alive signal comprises a broadcast of a discovery signal from the remote node.

12. The apparatus of claim 9 wherein the keep-alive signal comprises a transmission directed to the apparatus.

13. An apparatus for wireless communications, comprising:
a processing system configured to send to a remote node a wireless request for support of wireless discovery, to receive from the remote node a wireless indication that the request is granted, and to respond to the indication by using the remote node to assist said apparatus in wirelesssly identifying another remote node that is available to communicate with said apparatus via an ad hoc wireless connection.

14. The apparatus of claim 13 wherein the processing system is further configured to use the remote node for discovery by enabling the remote node to broadcast a discovery signal for the apparatus.

15. The apparatus of claim 14 wherein the processing system is further configured to send a keep-alive signal to enable the remote node to continue to broadcast the discovery signal.

16. The apparatus of claim 15 wherein the processing system is further configured to sleep during at least a portion of a time when the processing system is not sending the keep-alive signal to the remote node.

17. The apparatus of claim 15 wherein the processor system is further configured to broadcast a second discovery signal.

18. The apparatus of claim 17 wherein the second discovery signal comprises the keep-alive signal.

19. The apparatus of claim 15 wherein the keep-alive signal comprises a transmission directed to the remote node.

20. The apparatus of claim 14 wherein the processing system is further configured to listen for a discovery signal.

21. The apparatus of claim 13 wherein the processing system is further configured to use the remote node for discovery by enabling the remote node to listen for a discovery signal.

22. The apparatus of claim 21 wherein the processing system is further configured to listen for a discovery signal.

23. The apparatus of claim 21 wherein the processing system is further configured to broadcast a discovery signal.

24. The apparatus of claim 13 wherein the processing system is further configured to receive a communication from the remote node indicating that the remote node is capable of supporting discovery for the apparatus.

25. The apparatus of claim 13 wherein the processing system is further configured to communicate to the remote node one or more attributes related to the discovery to enable the remote node to listen for a discovery signal having at least one of the one or more attributes.

26. A method for wireless communications at an apparatus, comprising:
receiving from a remote node a wireless request to support wireless discovery; and
responding to the request, including sending to the remote node a wireless indication that the request is granted, and assisting the remote node in wirelessly identifying another remote node that is available to communicate with the remote node via an ad hoc wireless connection.

27. The method of claim 26 wherein the discovery for the remote node is supported by broadcasting a discovery signal for the remote node.

28. The method of claim 27 wherein the discovery signal comprises information indicating that the discovery signal is being broadcast for the remote node.

29. The method of claim 26 wherein the discovery for the remote node is supported by listening for a discovery signal.

30. The method of claim 29 further comprising notifying the remote node in response to receiving a discovery signal from said another remote node so that the remote node can connect to said another remote node.

31. The method of claim 26 further comprising communicating to the remote node that the apparatus is capable of supporting discovery for the remote node.

32. The method of claim 26 further comprising receiving a communication from the remote node comprising one or more attributes related to the discovery for the remote node.

33. The method of claim 32 wherein the discovery for the remote node is supported by listening for a discovery signal having at least one of the one or more attributes.

34. The method of claim 26 wherein the support of the discovery for the remote node is continued in response to a keep-alive signal from the remote node.

35. The method of claim 34 wherein the support of the discovery for the remote node is stopped in response to a predetermined time expiring before the keep-alive signal is received from the remote node.

36. The method of claim 34 wherein the keep-alive signal comprises a broadcast of a discovery signal from the remote node.

37. The method of claim 34 wherein the keep-alive signal comprises a transmission directed to the apparatus.

38. A method for wireless communications at an apparatus, comprising:
sending to a remote node a wireless request for support of wireless discovery;
receiving from the remote node a wireless indication that the request is granted; and
in response to the indication, using the remote node to assist said apparatus in wirelessly identifying another remote node that is available to communicate with said apparatus via an ad hoc wireless connection.

39. The method of claim 38 wherein the remote node is used for discovery by enabling the remote node to broadcast a discovery signal for the apparatus.

40. The method of claim 39 further comprising sending a keep-alive signal to enable the remote node to continue to broadcast the discovery signal.

41. The method of claim 40 further comprising sleeping during at least a portion of a time when not sending the keep-alive signal to the remote node.

42. The method of claim 40 further comprising broadcasting a second discovery signal.

43. The method of claim 42 wherein the second discovery signal comprises the keep-alive signal.

44. The method of claim 40 wherein the keep-alive signal comprises a transmission directed to the remote node.

45. The method of claim 39 further comprising listening for a discovery signal.

46. The method of claim 38 wherein the remote node is used for discovery by enabling the remote node to listen for a discovery signal.

47. The method of claim 46 further comprising listening for the discovery signal.

48. The method of claim 46 further comprising broadcasting a discovery signal.

49. The method of claim 38 further comprising receiving a communication from the remote node indicating that the remote node is capable of supporting discovery for the apparatus.

50. The method of claim 38 further comprising communicating to the remote node one or more attributes related to the discovery to enable the remote node to listen for a discovery signal having at least one of the one or more attributes.

51. An apparatus for wireless communications, comprising:
   means for wireless connecting to a remote node;
   means for receiving from the remote node a wireless request to support wireless discovery; and
   means for responding to the request, wherein said responding includes sending to the remote node a wireless indication that the request is granted, and assisting the remote node in wirelessly identifying another remote node that is available to communicate with the remote node via an ad hoc wireless connection.

52. The apparatus of claim 51 wherein the means for supporting wireless discovery comprises means for broadcasting a discovery signal for the remote node.

53. The apparatus of claim 52 wherein the discovery signal comprises information indicating that the discovery signal is being broadcast for the remote node.

54. The apparatus of claim 51 wherein the means for supporting wireless discovery comprises means for listening for a discovery signal.

55. The apparatus of claim 54 further comprising means for notifying the remote node in response to receiving a discovery signal from said another remote node so that the remote node can connect to said another remote node.

56. The apparatus of claim 51 further comprising means for communicating to the remote node that the apparatus is capable of supporting discovery for the remote node.

57. The apparatus of claim 51 wherein the means for supporting wireless discovery comprises means for receiving a communication from the remote node comprising one or more attributes related to the discovery for the remote node.

58. The apparatus of claim 57 wherein the means for supporting wireless discovery comprises means for listening for a discovery signal having at least one of the one or more attributes.

59. The apparatus of claim 51 wherein the means for supporting wireless discovery comprises means for continuing to support the discovery in response to a keep-alive signal from the remote node.

60. The apparatus of claim 59 wherein the means for supporting wireless discovery includes means for stopping supporting the wireless discovery for the remote node in response to a predetermined time[r] expiring before the keep-alive signal is received from the remote node.

61. The apparatus of claim 59 wherein the keep-alive signal comprises a broadcast of a discovery signal from the remote node.

62. The apparatus of claim 59 wherein the keep-alive signal comprises a transmission directed to the apparatus.

63. An apparatus for wireless communications, comprising:
   means for wireless connecting to a remote node;
   means for sending to the remote node a wireless request for support of wireless discovery;
   means for receiving from the remote node a wireless indication that the request is granted; and
   means responsive to the indication for using the remote node to assist said apparatus in wirelessly identifying another remote node that is available to communicate with said apparatus via an ad hoc wireless connection.

64. The apparatus of claim 63 wherein means for using the remote node comprises means for enabling the remote node to broadcast a discovery signal for the apparatus.

65. The apparatus of claim 64 further comprising means for sending a keep-alive signal to enable the remote node to continue to broadcast the discovery signal.

66. The apparatus of claim 65 further comprising means for sleeping during at least a portion of a time when not sending the keep-alive signal to the remote node.

67. The apparatus of claim 65 further comprising means for broadcasting a second discovery signal.

68. The apparatus of claim 67 wherein the second discovery signal comprises the keep-alive signal.

69. The apparatus of claim 65 wherein the keep-alive signal comprises a transmission directed to the remote node.

70. The apparatus of claim 64 further comprising means for listening for a discovery signal.

71. The apparatus of claim 63 wherein the means for using the remote node comprises means for enabling the remote node to listen for a discovery signal.

72. The apparatus of claim 71 further comprising means listening for the discovery signal.

73. The apparatus of claim 71 further comprising means for broadcasting a discovery signal.

74. The apparatus of claim 63 further comprising means for receiving a communication from the remote node indicating that the remote node is capable of supporting discovery for the apparatus.

75. The apparatus of claim 63 further comprising means for communicating to the remote node one or more attributes related to the discovery to enable the remote node to listen for a discovery signal having at least one of the one or more attributes.

76. A wireless access point, comprising:
   a wireless interface configured to support a backhaul connection for a wireless access terminal; and
   a processing system configured to support the wireless interface, the processing system being further configured to receive from the wireless access terminal a wireless request to support wireless discovery, and to respond to the request by sending to the wireless access terminal a wireless indication that the request is granted, and by assisting the wireless access terminal in wirelessly identifying another wireless access terminal that is available to communicate with the wireless access terminal via an ad hoc wireless connection.

77. A wireless access terminal, comprising:

a processing system configured to send to a wireless access point a wireless request for support of wireless discovery, to receive from the wireless access point a wireless indication that the request is granted, and to respond to the indication by using the wireless access point to assist said wireless access terminal in wirelessly identifying another wireless access terminal that is available to communicate with said wireless access terminal via an ad hoc wireless connection; and a user interface supported by the processing system.

78. A computer-program product for communication, comprising:

a non-transitory machine-readable medium comprising instructions executable by a processing system to receive from a first wireless communication node a wireless request to support wireless discovery, and to respond to the request by sending to the first wireless communication node a wireless indication that the request is granted, and by assisting the first wireless communication node in wirelessly identifying a second wireless communication node that is available to communicate with the first wireless communication node via an ad hoc wireless connection, wherein the processing system is provided in a wireless communication apparatus that is remote from the first and second wireless communication nodes.

79. A computer-program product for communication, comprising:

a non-transitory machine-readable medium comprising instructions executable by a processing system to send to a first wireless communication node a wireless request for support of wireless discovery, to receive from the first wireless communication node a wireless indication that the request is granted, and to respond to the indication by using the first wireless communication node to assist a wireless communication apparatus in wirelessly identifying a second wireless communication node that is available to communicate with said wireless communication apparatus via an ad hoc wireless connection, wherein said wireless communication apparatus contains said processing system and is remote from said first and second wireless communication nodes.

\* \* \* \* \*